US007305479B1

(12) United States Patent
Morris et al.

(10) Patent No.: US 7,305,479 B1
(45) Date of Patent: Dec. 4, 2007

(54) METHODS AND APPARATUS FOR DELIVERY OF CONTENT REQUESTS WITHIN A CONTENT DELIVERY NETWORK

(75) Inventors: Stephen Morris, Harvard, MA (US); Richard Clarkson, Westborough, MA (US)

(73) Assignee: Cisco Technology, Inc., San Jose, CA (US)

( * ) Notice: Subject to any disclaimer, the term of this patent is extended or adjusted under 35 U.S.C. 154(b) by 837 days.

(21) Appl. No.: 10/436,767

(22) Filed: May 13, 2003

(51) Int. Cl.
*G06F 15/16* (2006.01)

(52) U.S. Cl. .................. 709/229; 709/227; 709/250

(58) Field of Classification Search ............... 709/201, 709/203, 217, 218, 219, 223, 227, 229, 230, 709/245, 250
See application file for complete search history.

(56) References Cited

U.S. PATENT DOCUMENTS

| | | | |
|---|---|---|---|
| 5,056,085 A | 10/1991 | Vu | 370/60 |
| 5,684,961 A | 11/1997 | Cidon et al. | 395/200.15 |
| 6,006,264 A | 12/1999 | Colby et al. | 709/226 |
| 6,078,590 A | 6/2000 | Farinacci et al. | 370/432 |
| 6,111,941 A | 8/2000 | Schreyer | 379/207 |
| 6,122,648 A | 9/2000 | Roderick | 707/513 |
| 6,163,807 A | 12/2000 | Hodgkinson et al. | 709/229 |
| 6,182,139 B1 | 1/2001 | Brendel | 709/226 |
| 6,205,481 B1 | 3/2001 | Heddaya et al. | 709/226 |
| 6,243,760 B1 | 6/2001 | Armbruster et al. | 709/243 |
| 6,331,983 B1 | 12/2001 | Haggerty et al. | 370/400 |
| 6,338,082 B1 | 1/2002 | Schneider | 709/203 |
| 6,389,462 B1 | 5/2002 | Cohen et al. | 709/218 |
| 6,484,143 B1 | 11/2002 | Swildens | 705/1 |
| 6,535,882 B2 | 3/2003 | Pasquali | 707/100 |
| 6,553,376 B1 | 4/2003 | Lewis | 701/1 |

(Continued)

FOREIGN PATENT DOCUMENTS

EP        0 967 559 A1     12/1999

(Continued)

OTHER PUBLICATIONS

Jian Ni, Danny H. K. Tsang, Ivan S. H. Yeung, and Xiaojun Hei. "Hierarchical Content Routing in Large-Scale Multimedia Content Delivery Network." May 2003. IEEE Internetional Conferences on Communications.*

(Continued)

*Primary Examiner*—William Vaughn
*Assistant Examiner*—Scott B. Christensen
(74) *Attorney, Agent, or Firm*—Bainwood Huang

(57) ABSTRACT

A content delivery network has a content switch that intercepts content requests transmitted toward the origin server. The content switch distinguishes the content request as originating either external to the content delivery network or from within the content delivery network. The content switch forwards external requests to a content router, within the content delivery network and forwards internal requests to the origin server. Devices external to the content delivery network do not access the content carried by the origin server directly and, therefore, the content delivery network does not require the origin server alter its content when storing the content on a content server within the content delivery network. Use of the content switch, therefore, minimizes or eliminates the time, effort, and expense of rewriting content cached from the origin server to the content server within the content delivery network.

13 Claims, 6 Drawing Sheets

U.S. PATENT DOCUMENTS

| | | | |
|---|---|---|---|
| 6,636,856 B2 | 10/2003 | Pasquali | 707/10 |
| 6,654,807 B2 | 11/2003 | Farber | 709/245 |
| 6,658,419 B2 | 12/2003 | Pasquali | 707/10 |
| 6,662,195 B1 | 12/2003 | Langseth | 707/200 |
| 2001/0056416 A1* | 12/2001 | Garcia-Luna-Aceves | 707/2 |
| 2002/0048269 A1* | 4/2002 | Hong et al. | 370/389 |
| 2002/0049608 A1* | 4/2002 | Hartsell et al. | 705/1 |

FOREIGN PATENT DOCUMENTS

| | | | |
|---|---|---|---|
| WO | WO/01/77841 A2 | 10/2001 | |

OTHER PUBLICATIONS

Katia Obraczka, et al., "Tool for Massively Replicating Internet Archives: Design, Implementation, and Experience", Distributed Computing Systems, 1996., Proceedings of the 16th International Conference on Hong Kong May 27-30, 1996, Los Alamitos, CA, USA, IEEE Comput. Soc, Us, May 27, 1996, pp. 657-664, XP010167640.

Ron White, How Computers Work. 1997, Ziff-Davis Press, Macmillan Computer Publishing USA, pp. 234-235.

* cited by examiner

METHODS AND APPARATUS FOR DELIVERY OF CONTENT REQUESTS WITHIN A CONTENT DELIVERY NETWORK

BACKGROUND

A computer network, such as the Internet, allows users to access information stored within one or more sites or servers associated with the network.

Certain networks, such as content delivery networks (CDN), provide for distribution of content to requesting users. A conventional CDN utilizes a group of servers, such as content delivery servers, for delivery of content from an originating content origin server to a requesting user. The CDN provides content to the requesting user, from a particular content delivery server, based on the relative distance between a content router (e.g., domain name server proxy) and the content delivery server. The distances can be based upon geography, network topology, network performance, or other metrics. A content delivery manager (CDM) associated with the CDN copies, or coordinates the copying of, the content from the originating content server to the content delivery servers within the CDN. Such servers are usually located at geographically distinct locations, although some locations can have multiple servers.

When a user device requests content (e.g., a Web page) from a content origin (e.g., origin server), certain mechanisms send the request, in accord with CDM-determined policy, to a suitable content delivery server within the CDN. A suitable server is defined as a server that is "close" to the content router servicing the requester in terms of the distances considered by the CDN. By sending the request to a server closer to the user device, the CDN provides relatively fast delivery of the content to the requesting user device. The CDN also acts to load balance multiple requests for content among the content delivery servers associated with the CDN to provide protection from large surges in traffic and overloading of a single content delivery server.

One conventional mechanism for sending a content request into the CDN involves the interception of the content request by a content router located in proximity to the origin server. For example, certain content routers, such as web cache control protocol (WCCP) enabled routers, are configured to intercept content requests sent toward an origin server and transmit the requests to a content server (e.g., a content server caching the requested content) in proximity (e.g., close) to the requesting user device.

Another conventional mechanism for sending a content request into the CDN involves explicit transmission of a request to a content delivery server, other than the origin server, within the CDN. For example, in a process known as non-transparent proxying, a requesting device browser is configured to send content requests, intended for an origin server, to a content server (e.g., a content server caching the requested content) within a CDN.

Another conventional mechanism for sending a content request into the CDN, for example, involves splitting or mirroring on a content server (e.g., content engine) located within the CDN, a website hosted by a host origin server. In such mirroring, the content server located within the CDN stores (e.g., caches) certain files or content associated with the website of the host origin server. The host origin server, for example, alters the content of the website, as stored by both the host origin server and the content server within the CDN, in order to distinguish the content (e.g., the content and the content locations) within a network. As the CDN receives requests for the content hosted by the origin server, the CDN transmits the content requests to the content server within the CDN.

In the case of conventional website splitting, the host origin server, for example, alters the content of the website, as stored by both the host origin server and the content server within the CDN, in order to distinguish the content (e.g., the content and the content locations) within a network. For example, after receiving a request for content from a content server within the CDN, the host origin server rewrites or renames the files or content to change the hostname associated with the content (e.g., renaming the file www.cars.com/photo.gif, as initially stored by the host origin server, into www.cars.newhost.com/photo.gif, to be stored by the content server within the CDN). In certain cases, the origin server renames multiple files or web pages that reference each other or include links to each other. In such a case, the host origin server rewrites the links of the renamed files. For example, requester engagement (e.g., clicking) of a link (e.g., Uniform Resource Locators or URL's) of a renamed web page served by the content server in the CDN sends the requester, via a DNS mechanism, to a subsequent web page served by the content server rather than by the host origin server. The host origin server then places (e.g., caches) the renamed files or content of a hosted website (e.g., the website hosted by the host origin server) on the requesting content server within the CDN.

Certain CDN content server providers, such as Akamai (Cambridge, Mass.) provide public CDN's having content servers for distribution of content originating from an origin server. Akamai CDN's have a load balancing device that intercepts content requests from a requesting device. The Akamai load balancing device uses a Domain Name Server (DNS) mechanism to direct the requesting device to an Akamai content server, within the CDN, having rewritten content from the origin server. During the renaming process, Akamai requires that origin servers rename the cached files or content in a particular Akamai format for storage on the Akamai servers. For example, requires rewriting of the link www.cars.com/foreign as http://www.akamai###.com/ http:// www.cars.com/foreign in the Akamai format.

SUMMARY

Conventional techniques and mechanisms that provide for delivery of content requests into a CDN suffer from a variety of deficiencies.

As described above, one conventional mechanism for sending a content request into the CDN involves the interception of the content request by a content router, such as web cache control protocol (WCCP) enabled router, located in proximity to the origin server. Many conventional routers, however, are not WCCP enabled and, therefore, transmit content requests to the origin server and not to the CDN for relatively efficient distribution of the requested content.

As described above, another conventional mechanism for sending a content request into the CDN involves explicit transmission of a request to a content delivery server, other than the origin server, within the CDN such as using a process known as non-transparent proxying. In non-transparent proxying, a requesting device browser is configured to send content requests, intended for an origin server, to a content server within a CDN. Such configuration is time consuming on the part of the end user. Furthermore, inexperienced users may not know how, or care, to configure their browsers to request content using non-transparent proxying. In such case, such non-configured browsers transmit content requests to the origin server and not to the CDN.

Also as described above another conventional mechanism for sending of content request into the CDN involves splitting or mirroring on a content server located within the CDN, a website hosted by a host origin server. In the case of conventional website splitting, the host origin server, for example, alters the content of the website, as stored by both the host origin server and the content server within the CDN, in order to distinguish the content (e.g., the content and the content locations) within a network.

Such alteration or renaming, however, takes a relatively large amount of time, effort, and expense and in certain cases, is inaccurate and prone to errors. Furthermore, with respect to Akamai CDN's, Aklamai requires renaming of files, cached on Akamai content servers, in a particular Akamai format. When an end user receives the content along with the rewritten name of the content according to the Akamai format (e.g., the rewritten URL of the content), however, the end user may be unclear as to the original source of the content (e.g., the origin server) by an examination of the Akamai version of the URL.

By contrast, embodiments of the present invention significantly overcome such deficiencies and provide mechanisms for delivering content requests into a content delivery network without requiring alteration of content initially stored on an origin server. A content delivery network has a content switch that intercepts content requests transmitted toward the origin server. The content switch distinguishes the content request as originating either external to the content delivery network or from within the content delivery network. The content switch forwards external requests to a content router, within the content delivery network and forwards internal requests to the origin server. Devices external to the content delivery network do not access the content carried by the origin server directly and, therefore, the content delivery network does not require the origin server alter its content when storing the content on a content server within the content delivery network. Use of the content switch, therefore, minimizes or eliminates the time, effort, and expense of rewriting content cached from the origin server to the content server within the content delivery network.

In one arrangement, an embodiment of the invention relates to a method for delivering a content request in a content delivery network having content servers for distribution of content of an origin server. In the method, a content switch receives the content request from a requesting device, the content request having a requesting device identifier. The content switch provides the content request to the origin server when the requesting device identifier indicates the requesting device is a content server of the content delivery network. The content switch provides the content request to a content router of the content delivery network when the requesting device identifier indicates the requesting device is a device not of the content delivery network. The content switch distinguishes the content requests as originating either external to the content delivery network or from within the content delivery network. Because the content switch distinguishes such requests, the origin server and the content server of the content delivery network serve the same content without requiring rewriting of content stored or cached from the origin server to a content server within the content delivery network.

In one arrangement, an embodiment of the invention relates to a method for retrieving content from an origin server. In the method, a content server receives a content request for content associated with the origin server. The content server prepares a content request having a content device marker associated with the content server. The content server transmits the content request to the origin server and receives content from the origin server in response to a content switch intercepting the content request, identifying the content device marker associated with the content request, and transmitting the content request to the origin server. The content switch distinguishes content requests as originating within the content delivery network or outside of the content delivery network based upon the content device marker. Use of the content device marker in conjunction with the content switch allows the origin server and the content server of the content delivery network to serve the same content without requiring rewriting of content stored or cached from the origin server to the content server within the content delivery network.

Other embodiments of the invention include a computer system, such as a data communications device, computerized device, or other device configured with software and/or circuitry to process and perform all of the method operations noted above and disclosed herein as embodiments of the invention. In such embodiments, the device, such as a data communications device comprises at least one communications interface (e.g., a network interface), a memory (e.g., any type of computer readable medium, storage or memory system), a processor and an interconnection mechanism connecting the communications interface, the processor and the memory. In such embodiments, the memory system is encoded with a content request delivery application that when performed on the processor, produces a content request delivery process that causes the computer system to perform any and/or all of the method embodiments, steps and operations explained herein as embodiments of the invention. In other words, a computer, switch, router, gateway, network bridge, proxy device or other network device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a data communications device software control application, such as a data communications device operating system configured with a content request delivery manager that operates as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein is considered an embodiment of the invention. Such embodiments of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other dedicated or general purpose electronic device to cause such a device to perform the techniques explained herein as embodiments of the invention.

The embodiments of the invention may be implemented by computer software and/or hardware mechanisms within a data communications device apparatus. It is to be understood that the system of the invention can be embodied strictly as a software program, as software and hardware, or as hardware and/or circuitry alone. The features of the invention, as explained herein, may be employed in data communications devices and other computerized devices and/or software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

Embodiments of the present invention significantly overcome such deficiencies and provide mechanisms for delivering content requests into a content delivery network without requiring alteration of content initially stored on an origin server. A content delivery network has a content switch that intercepts content requests transmitted toward the origin server. The content switch distinguishes the content request as originating either external to the content delivery network or from within the content delivery network. The content switch forwards external requests to a content router, within the content delivery network and forwards internal requests to the origin server. Devices external to the content delivery network do not access the content carried by the origin server directly and, therefore, the content delivery network does not require the origin server alter its content when storing the content on a content server within the content delivery network. Use of the content switch, therefore, minimizes or eliminates the time, effort, and expense of rewriting content cached from the origin server to the content server within the content delivery network.

Figure 1:
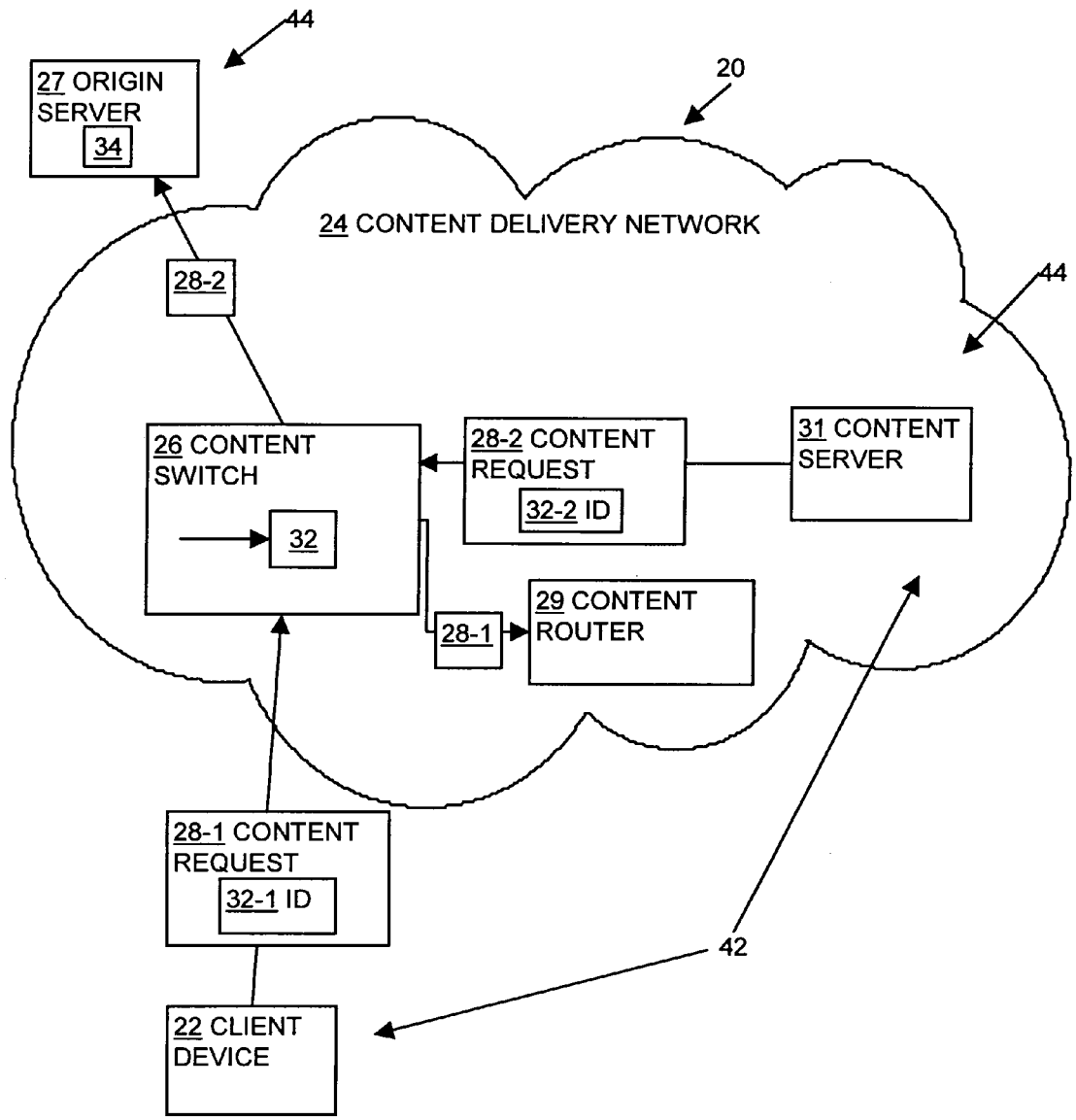
FIG. 1 is a block diagram of a content distribution system, configured according to one embodiment of the invention.

FIG. 1 illustrates a content distribution system 20, according to one embodiment of the invention. In one arrangement, the content distribution system 20 includes a content delivery network (CDN) 24, an origin server 27, and a client device 22. The CDN 24 for example, has a content switch 26, a content router 29, and a content server 31. As illustrated, the client device and the origin server 27 are located external to the CDN 24.

The CDN 24 utilizes a group of devices, such as one or more content servers 31, to distribute content to a requesting user or client device 22. In one embodiment, the CDN 24 is a network such as the Internet or a local area network (LAN).

The content server 31, in one arrangement, is a computerized device within the CDN 24 that helps to provide relatively fast delivery of content to a client device 22 in response to the client device 22 (e.g., a browser of the client device 22) sending a content request 28 to the CDN 24. For example, the content server 31, or content engine, is configured to cache content 34 (e.g., a web page) from the origin server 27 to provide the content 34 to the client device 22, in response to receiving a content request 28 for the content 34 from the client device 22.

The content router 29 is configured to redirect content requests 28 from the client device 22 to the content server 31 within the CDN 24. For example, in one arrangement, the CDN 24 includes multiple content servers 31. As part of the CDN 24, the content router 29 is configured with information regarding the location or placement of content 34 on content servers 31 within the CDN 24 and the relative health or loading of the content servers 31 within the CDN 24. During operation, the content router 29 receives a content request 28 from the content switch 26. The content router 29 redirects the requesting client device 22 (e.g., the client device 22 transmitting the content request 28) to a content server 31 within the CDN 24 either based upon the location of the content server 31 within the CDN 24, relative to the requesting user or client device 22, or based upon the relative load of the content server 31.

The origin server 27, in one arrangement, is a data center, in communication with the content switch 26 and the content server 31, that stores content, such as a web site having multiple or related web pages (e.g., subpages). In one arrangement, the origin server 27 is an origin server farm having multiple origin servers 27. The origin server 27 is configured to provide content to a requesting content server 31 in response to receiving a content request 28 from the requesting content server 31.

The content switch 26 is a computerized device, such as a computer, switch, router, or gateway, configured to intercept requests 28 for content transmitted toward the origin server 27. In one arrangement, the content switch 26 is a Content Services Switch, manufactured by Cisco Systems, Inc. of San Jose, Calif. In another arrangement, the content switch 26 is a Content Switching Module, also manufactured by Cisco Systems, Inc. of San Jose, Calif.

The client device 22 is a computerized device, such as a laptop or personal computer, configured to request content from the origin server 27. For example, the client device 22 is configured with a browser used to request a web page from the origin server 27. As illustrated, the client device 22 is external to the CDN 24 and does not form part of the CDN 24.

Figure 2:
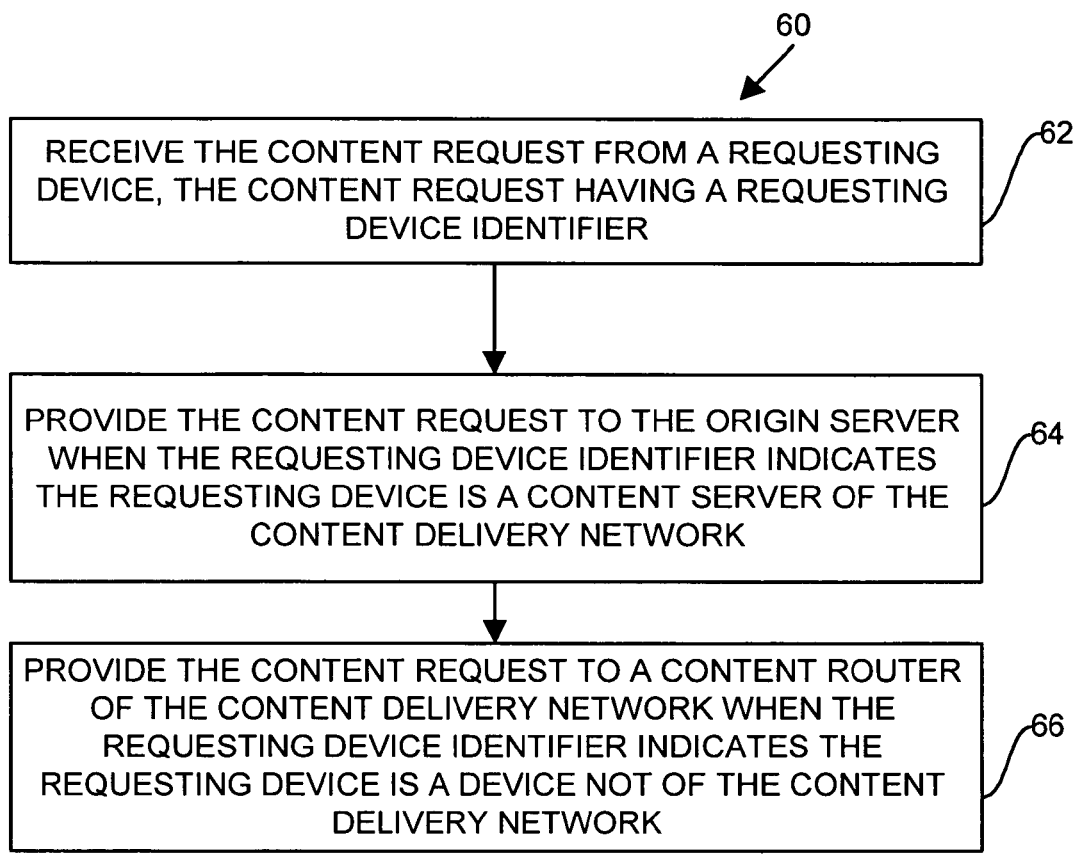
FIG. 2 is a flowchart of a procedure performed by the content switch of FIG. 1, configured according to one embodiment of the invention.

FIG. 2 illustrates a flowchart showing a method 60 performed by the content switch 26 of the content distribution system 20, according to one arrangement. In the method 60, the content switch 26 transmits a content request 28 to a destination device 44, based upon the origin of the content request 28 (e.g., a requesting device 42 transmitting the content request 28).

In step 62, the content switch 26 receives a content request 28 from a requesting device 42 where the content request 28 has a requesting device identifier 32. As illustrated in FIG. 1, the requesting device 42 is either the client device 22 or the content server 31.

In one arrangement, the requesting device 42 is the client device 22 that transmits a content request 28-1, having device identifier 32-1, to the origin server 27. The content switch 26 intercepts the content request 28-1 from the client device 22 prior to the content request 28-1 reaching the origin server 27. In one arrangement, the requesting device 42 is the content server 31 that transmits the content request 28-2, having device identifier 32-2, to the origin server 27 to cache content from the origin server 27. The content switch 26 intercepts the content request 28-2 from the content server 31 prior to the content request 28-2 reaching the origin server 27.

Returning to FIG. 2, in step 64, the content switch 26 provides the content request 28 to the origin server 27 when the requesting device identifier 32 indicates the requesting device 42 is a content server 31 of the content delivery network 24. For example, the content server 31 within the CDN 24 transmits a content request 28-2 to the origin server 27 in order to retrieve or cache content 34 from the origin server 27. The server 31, in turn, provides content 34 received from the origin server 27 to a requesting user or client device 22. As illustrated in FIG. 1, the content switch 26 detects a requesting device identifier 32-2 of the content request 28-2 and, as will be described in detail below, utilizes the requesting device identifier 32-2 to distinguish the content request 28-2 as originating within the CDN 24 (e.g., the content request 28-2 originates from the content server 31 within the CDN 24).

Returning to FIG. 2, in step 66, the content switch 26 provides the content request 28 to a content router 29 of the content delivery network 24 when the requesting device identifier 32 indicates the requesting device 42 is a device not of the content delivery network 24. For example, the client device 22 transmits a content request 28-1 to the origin server 27 in order to retrieve content advertised by the origin server 27. The content switch 26 intercepts the content request 28-1 and detects a requesting device identifier 32-1 of the content request 28-1. The content switch 26, as will be described in detail below, utilizes the requesting device identifier 32-1 to distinguish the content request 28-1 as originating external to the CDN 24 (e.g., the content request 28-2 originates from the client device 22).

By distinguishing content requests 28 originating external to the CDN 24 from content requests 28 originating within the CDN 24, the content switch 26 transmits external content requests 28-1 away from the origin server 27 and toward the content router 29 within the CDN 24. Based upon the configuration of the content router 29, the content router 29 redirects the client device 22 to a content server or content engine 31 within the CDN 24. The external client device 22, therefore, does not directly access the origin server 27 to retrieve content 34 associated with the origin server 27. Instead, the client device 22 accesses the content 34 associated with the origin server 27 through the content server 31 of the CDN 24 (e.g., the client device retrieves requested content through the content server 31 and not through the origin server 27).

When used in conjunction with the content switch 26 and the content router 29, the content server 31 of the CDN 24 hosts the content (e.g., web site) of the origin server 27 without requiring the origin server 27 to split the content between the origin server 27 and the content server 31 or rewrite the content (e.g., renaming of the files and rewriting of the links or URL's associated with the files), as required in a conventional web site splitting procedure. The content switch 26, therefore, minimizes or eliminates the time, effort, and expense of rewriting content 34 cached from the origin server 27 to the content server 31 within the CDN 24. Furthermore, the content switch 26 allows the same content (e.g., same unmodified web page) to be delivered from either the origin server 27 or from the content server 31.

During operation, the content switch 26 allows the content server 31 of the CDN 24 to host the content (e.g., web site) of the origin server 27 without requiring the origin server 27 to split the content 34 between the origin server 27 and the content server 31 or adjust (e.g., rename) the content cached on the content server 31. Because the content switch 26 does not require the origin server 27 to modify the content placed in the CDN 24, use of the content switch 26 allows removal of the CDN 24 with a minimal cost and inconvenience to an origin server operator (e.g., a company placing the content on the origin server 27). In the case where a conventional origin server modifies content placed in a CDN, undoing or removal of the CDN requires unmodifying of the content and leaves many rewritten URL's bookmarked in browsers across a network, such as the Internet. Once an origin server operator removes such a CDN, the rewritten URL's are no longer operational (e.g., return errors to the browsers attempting to access the rewritten and nonexistent links). With the present content distribution system 20, because the origin server 27 does not modify the names or URLs of content (e.g., a web page) cached in the CDN 24, an origin server operator has a minimal barrier (e.g., cost and inconvenience) for removing the CDN 24.

As described, the content switch 26 transmits content requests 28 to a destination 44, either the origin server 27 or a content server 31, based upon the sender identifier 32 associated with the content request 28. The content switch 26 distinguishes or detects the requesting device 42 as being part of the CDN 24 or external to the CDN 24 based upon the sender identifier 32.

Figure 3:
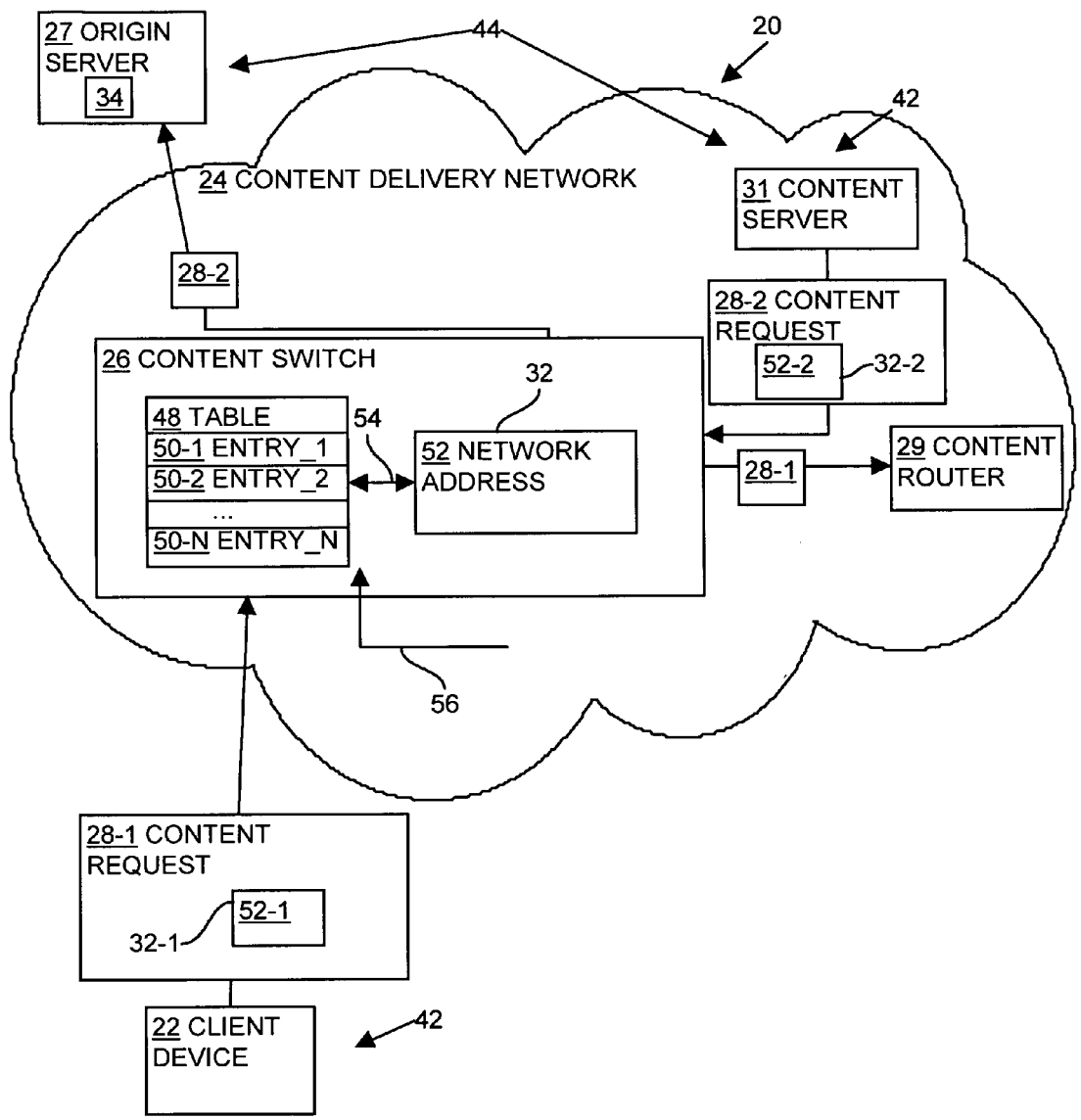
FIG. 3 is a block diagram of the content distribution system of FIG. 1, configured according to one embodiment of the invention.

FIG. 3 illustrates one arrangement of the sender identifier 32 as detected by the content switch 26. In such an arrangement, the content switch 26 receives the content request 28 from a requesting device 42 where the content request 28 includes a network address 52, such as an Internet Protocol (IP) address, identifying the requesting device 42. Based upon the network address 52 of the sending device 42, the content switch 26 detects the origin of the requesting device 42 as either the client device 22 or the content server 31. Detection of the network address 52 associated with a content request 28 allows the content switch 26 to distinguish content requests 28 based upon a controlled detection mechanism.

In one arrangement, as shown in FIG. 3, the content switch 26 is configured with a table 48 having network identification entries 50. Each entry, 50-1 through 50-N, corresponds to a network address 52 of each content server 31 within the CDN 24. By comparing the network address 52 of an incoming content request 28 with each entry 50, such as the network identification entries 50-1 through 50-N, in the table 48, the content switch 26 distinguishes the content request 28 as originating either from the content server 31 within the CDN 24 or from the client device 22 external to the CDN 24. Based upon the originating requesting device 42, the content switch 26 transmits the content request 28 to an appropriate destination device 44, as described below.

During operation, for example, assume the content server 31 transmits the content request 28-2 to the content switch 26. The content switch 26 compares the network address 52-2 of the content request 28-2 with the entries 50-1 through 50-N located in the table 48. Because the table 48 includes (e.g., is configured with) all of the network addresses of the content servers 31 within the CDN 24 and because the content server 31 is part of the CDN 24, the content switch 26 detects 54 a correspondence between the network address 52-2 and one of network identification entries 50 within the table 48. Based on such detection 54, the content switch 26 detects the content request 28-2 as originating within the CDN 24 and provides the content request 28-2 to the origin server 27.

During operation, in another example, assume the client device 22 transmits the content request 28-1 to the content switch 26. The content switch 26 compares the network address 52-1 of the content request 28-1 with the entries 50-1 through 50-N, such as located in the table 48. As described, the table 48 includes or is configured with all of the network addresses of the content servers 31 within the CDN 24. In the arrangement, shown, the table 48 is not configured with the network addresses of devices, such as the client device 22, external to the CDN 24. As a result of the comparison, the content switch 26, detects 54 no correspondence between the network address 52-1 and one of network identification entries 50 within the table 48. Based upon such detection 54, the content switch 26 detects the content request 28-1 as originating external to the CDN 24 and provides the content request 28-1 to the content router 29 of the CDN 24. The content router 29, in turn, redirects the requesting client device 22 to a content server 31 within the CDN 24.

As described above, the content switch 26 is configured with the table 48 that includes network identification entries 50 where each entry 50 corresponds to a network address of a content server within the CDN 24. In one arrangement, the content switch receives 56 configuration instructions, such as the table 48, from a device within the CDM, such as a content distribution manager (CDM). For example, the CDM transmits the configuration instructions 48 to the content switch 26 to reconfigure the content switch 26 to account for additions or removals of content servers 31 within the CDN 24. Because the configuration instructions 48 allow reconfiguration of the content switch 26, the configuration instructions 58 provide flexibility to the content switch 26.

Figure 4:
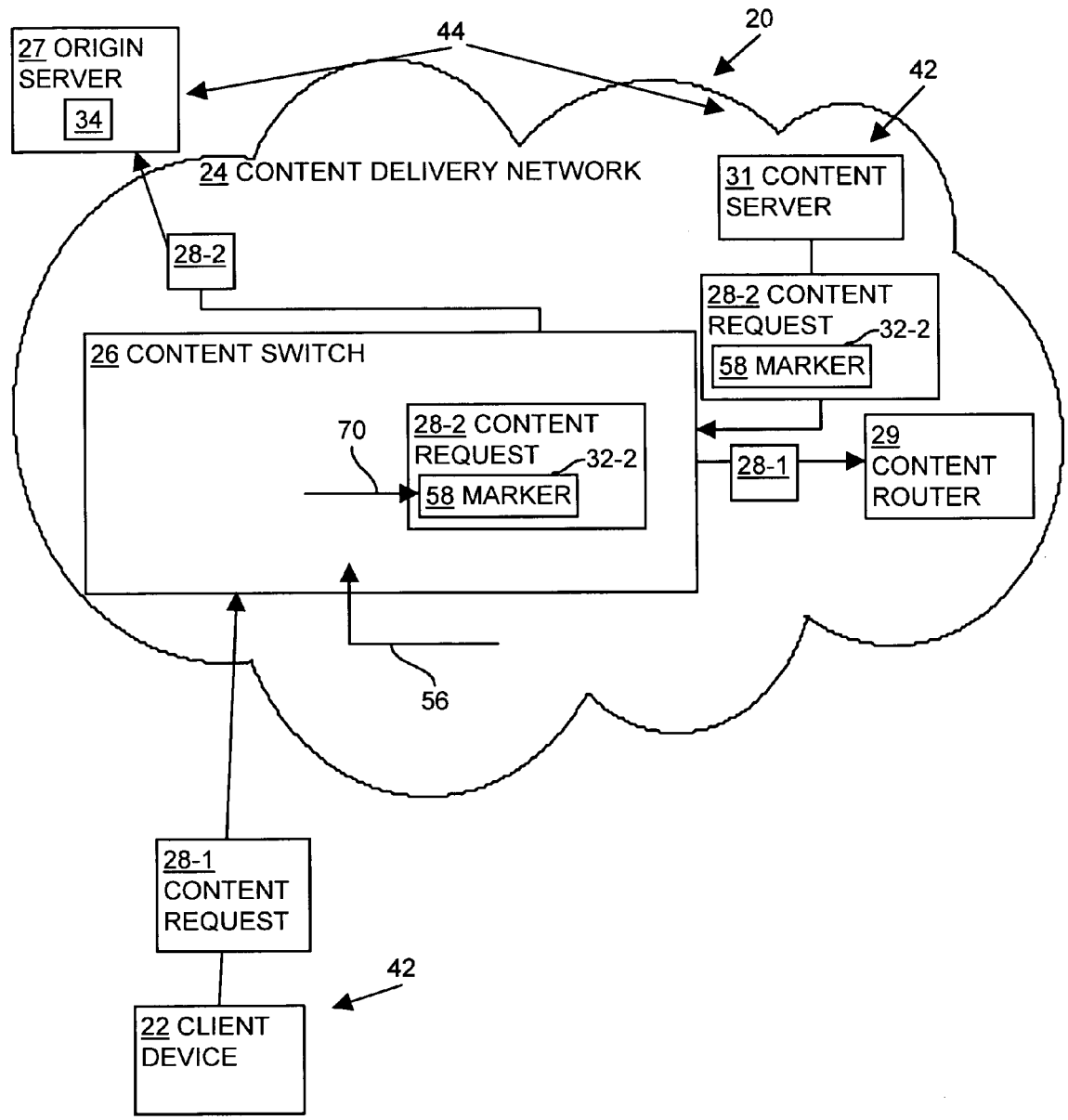
FIG. 4 is a block diagram of the content distribution system of FIG. 1, configured according to one embodiment of the invention.

FIG. 4 illustrates one arrangement of the sender identifier 32 as detected by the content switch 26. In such an arrangement, the content server 31 transmits the content request 28-2 where the content request 28 includes, as the sender identifier 32-2, a content device marker 58. For example, the content device marker 58 is a cookie or a tag inserted, by the content server 31, in a header of the content request 28-2. The content switch 26 distinguishes the content request 28 as originating from the content server 31 within the CDN 24, as opposed to originating from the client device 22 external to the CDN 24, based upon the presence of the marker 58.

During operation, for example, assume the content server 31 transmits a content device marker 58, as part of a content request 28-2, to the content switch 26. The content switch 26 receives the content request 28-2 and examines the content request for the presence of the marker 58. For example, the content switch 28 examines the header of the content request 28-2, for example and detects 70 the presence of the marker 58. Based on such detection 70, the content switch 26 detects the content request 28-2 as originating from a requesting device 42 (e.g., content server 31) within the CDN 24 and provides the content request 28-2 to the origin server 27.

During operation, in another example, assume the content switch 26 receives a content request 28-1 from the client device 22. The client device 22 is not configured to include a marker 58 within the content request 28-1 (e.g., thereby allowing the content switch 26 to distinguish content requests 28-2 originating from the content server 31 from content requests 28-1 originating from the client device 22). The content switch 26 examines the content request 28-1 from the client device 22, such as by examining the header of the content request 28-1, and detects not receiving a content device marker 58 associated with the content request 28-1. The content switch 26 detects the content request 28-2 as originating from a requesting device 42 external to the CDN 24 and provides the content request 28-1 to the content router 29 within the CDN 24.

As described above, by distinguishing content requests 28 originating external to the CDN 24 from content requests 28 originating within the CDN 24, the content switch 26 transmits external content requests 28-1 away from the origin server 27 and toward a content router 29 within the CDN 24. The external client device 22, therefore, does not directly access the origin server 27 to retrieve content 34 associated with the origin server 27. When used in conjunction with the content switch 26, the content server 31 of the CDN 24 hosts the content (e.g., web site) of the origin server 27 without requiring the origin server 27 to split the content between the origin server 27 and the content server 31 or rewrite the content (e.g., renaming of the files and rewriting of the links or URL's associated with the files), as required in a conventional web site splitting procedure. The content switch 26, therefore, minimizes or eliminates the time, effort, and expense of rewriting content cached from the origin server 27 to the content server 31 within the CDN 24.

Figure 5:
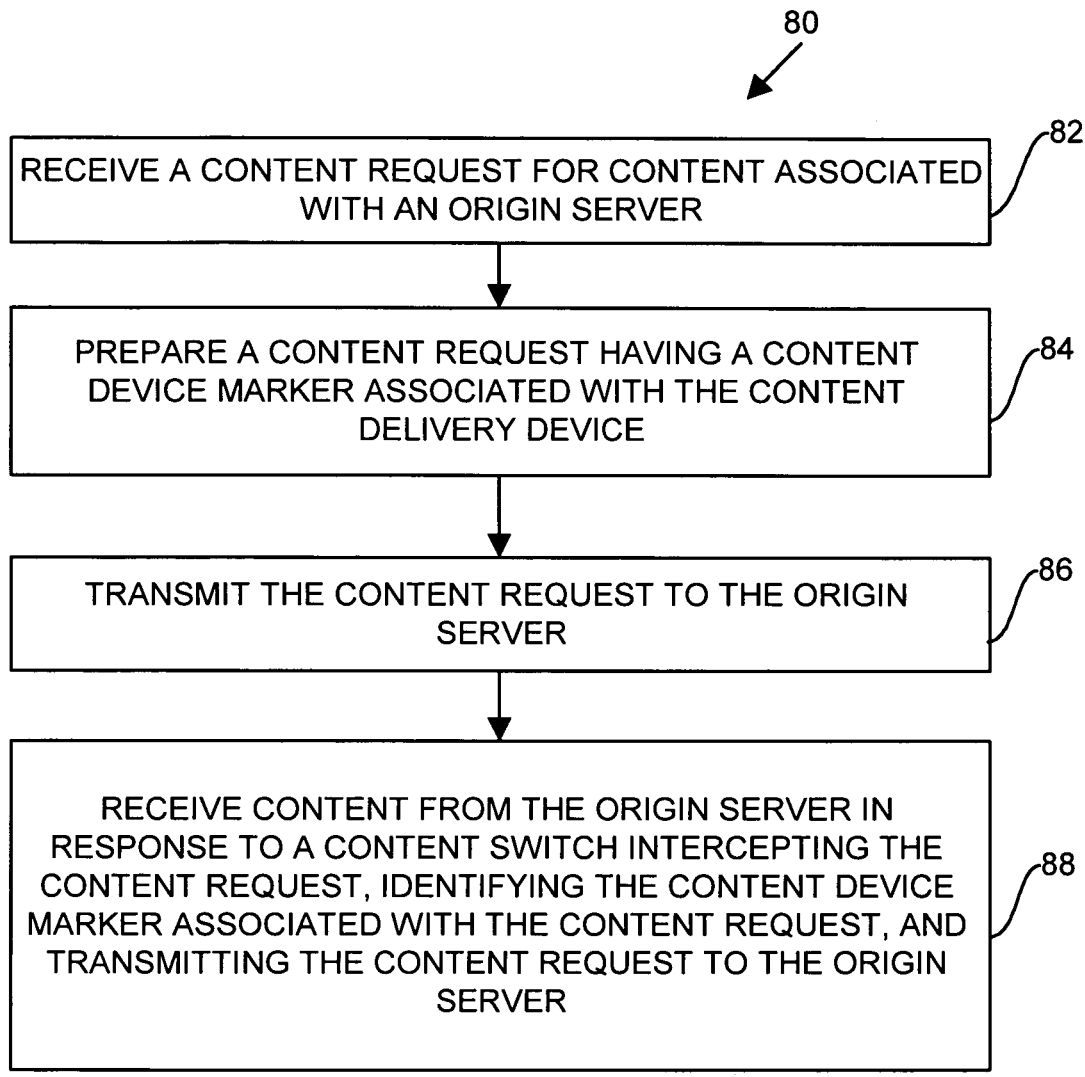
FIG. 5 is a flowchart of a procedure performed by the content server of FIG. 1, configured according to one embodiment of the invention.

FIG. 5 illustrates a flowchart showing a method 80 performed by the content server 31 of the content distribution system 20, according to one arrangement. In the method 80, the content server 31 within the CDN 24, retrieves content 34 from an origin server 27.

In step 82, the content server 31 receives a content request 28 for content associated with the origin server 27. For example, the content server 31 receives the content request 28 from the client device 22 via a content router 29 redirecting the client device 22 to the content server 31.

In step 84, the content server 31 prepares a content request 28-2 having a content device marker 58 associated with the content server 31. For example, in the case where the content server 31 within the CDN 24 does not have (e.g., has not previously cached) the requested content, the content server 31 prepares the content request 28-2 in order to retrieve the requested content from the origin server 27. The content server 31 includes, as part of the content request 28-2, the content device marker 58 to identify the content request as originating from a content server 31 within the CDN 24. As described above, the content device marker 58 is a header or tag inserted by the content server 31 into the content request 28-2.

In step 86, the content server 31 transmits the content request 28-2 to the origin server 27.

In step 88, the content server 31 receives content from the origin server 27 in response to the content switch 26 intercepting the content request 28-2, identifying the content device marker 58 associated with the content request 28-2, and transmitting the content request 28-2 to the origin server 27. The content server 31 receives the requested content from the origin server 27 for distribution to the requesting client device 22. Such distribution of content from the origin server 27 occurs without splitting the content hosted by the origin server 27 and without rewriting the content (e.g., web site) when caching the content 34 onto the content server 31 within the CDN 24.

Figure 6:
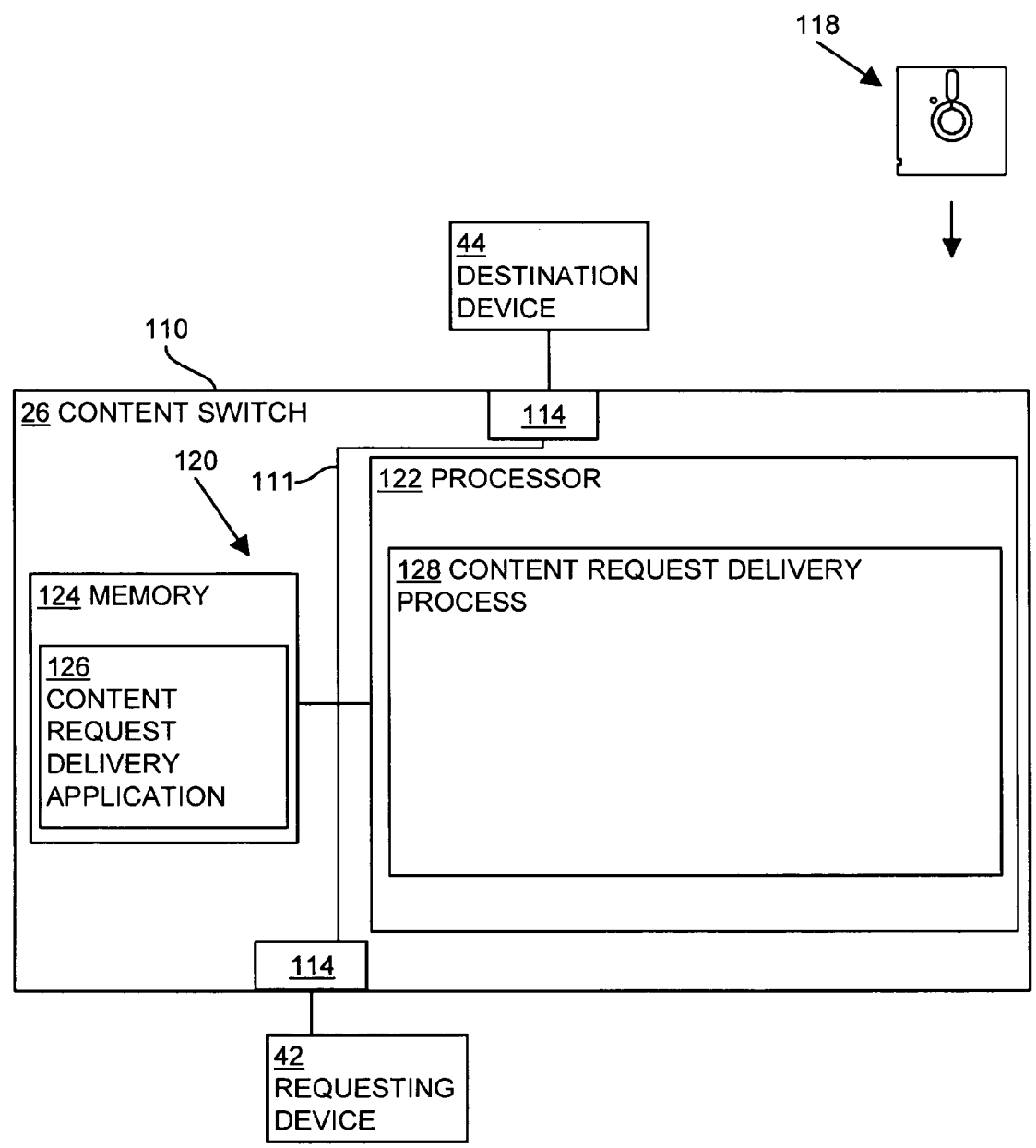
FIG. 6 is a block diagram of a computerized device, configured as a content switch, according to one embodiment of the invention.

FIG. 6 illustrates a more detailed architecture of a computerized device 110 configured as a content switch 26 according to one embodiment of the invention. A computer program product 118 includes an application or logic instructions, such as content request delivery instructions, that are loaded into the computerized device 110 to configure the computerized device 110 to transmit a content request, within a CDN, to a particular destination device 44 (e.g., content router 29 or origin server 27) based upon the requesting device 42 (e.g., client device 22 or content server 31).

The computerized device 110 in this embodiment of the invention includes an interconnection mechanism 111 such as a data bus and/or other circuitry that interconnects a controller 120, including a memory 124 and a processor 122, and one or more communications interfaces 114.

The memory 124 can be any type of volatile or non-volatile memory or storage system such as computer memory (e.g., random access memory (RAM), read-only memory (ROM), or other electronic memory), disk memory (e.g., hard disk, floppy disk, optical disk and so forth). The memory 124 is encoded with logic instructions (e.g., software code) and/or data that form a content request delivery application 126 configured according to embodiments of the invention. In other words, the content request delivery application 126 represents software code, instructions and/or data that represent or convey the processing logic steps and operations as explained herein and that reside within memory or storage or within any computer readable medium accessible to the computerized device 110.

The processor 122 represents any type of circuitry or processing device such as a central processing unit, microprocessor or application-specific integrated circuit that can access the content request delivery application 126 encoded within the memory 124 over the interconnection mechanism 111 in order to execute, run, interpret, operate or otherwise perform logic instructions of the content request delivery application 126. Doing so forms the content request delivery process 128. In other words, the content request delivery process 128 represents one or more portions of the logic instructions of the content request delivery application 126 while being executed or otherwise performed on, by, or in the processor 122 within the computerized device 110.

Those skilled in the art will understand that there can be many variations made to the embodiments explained above while still achieving the same objective of those embodiments and the invention in general.

For example, FIG. 1 illustrates a single content server 31 within the CDN 24. Such an arrangement is by way of example only. In another arrangement, the CDN 24 includes multiple content servers 31, such as content servers, located at various geographic locations relative to the client device 22 for example. Each of the multiple content server 31 caches content, such as a web site, from the origin server 27 without requiring the origin server 27 to alter the web site (e.g., rename web pages or rewrite links or URL associated with the web pages). The content switch 26 transmits content requests 28-1 from the client device 22 to the content router 29. The content router, in turn, redirects the client device 22 to an appropriate content server 31 within the CDN 24 based upon the geographic proximity or relative loading of the content servers 31 within the CDN 24.

Such variations are intended to be covered by the scope of this invention. As such, the foregoing description of embodiments of the invention is not intended to be limiting. Rather, any limitations to the invention are presented in the following claims.

What is claimed is:

1. In a content delivery network having content devices for distribution content of an origin server, a method for delivering a content request comprising the steps of:
    receiving the content request from a requesting device, the content request having a requesting device identifier;
    providing the content request to the origin server when the requesting device identifier indicates the requesting device is a content server of the content delivery network; and
    providing the content request to a content router of the content delivery network when the requesting device identifier indicates the requesting device is a device not of the content delivery network;
    wherein:
    receiving the content request from the requesting device comprises intercepting, by a content switch, the content request having the requesting device identifier and detecting, by the content switch, the requesting device identifier of the content request to distinguish the content request as originating either external from the content delivery network or as originating internal to the content delivery network;
    providing the content request to the origin server comprises transmitting, by the content switch, the content request to the origin server based upon detecting that the requesting device identifier indicates the content request as originating internal to the content delivery network from the content server; and
    providing the content request to the content router of the content delivery network comprises transmitting, by the content switch, the content request to the content router of the content delivery network, for delivery to the content server of the content delivery network, based upon detecting that the requesting device identifier indicates the content request as originating from a device external from the content delivery network;
    based upon receiving a content device marker associated with the content request, providing the content request to the origin server; and
    based upon receiving no content device marker associated with the content request, providing the content request to a content router of the content delivery network.

2. The method of claim 1 wherein the step of receiving the content request comprises the step of receiving the content request from a requesting device, the content request having a network address of the requesting device.

3. The method of claim 2 further comprising the steps of:
    comparing the network address of the requesting device with at least one network identification entry, each of the at least one network identification entries corresponding to a content server of the content delivery network;
    based upon detecting a correspondence between the network address and one of the at least one network identification entries, providing the content request to the origin server; and
    based upon detecting no correspondence between the network address and any of the at least one network identification entries, providing the content request to a content server of the content delivery network.

4. The method of claim 1 further comprising the step of receiving configuration instructions having at least one network identification entry, the at least one network identification entry corresponding to a content server of the content delivery network.

5. A computerized device comprising:
at least one communications interface;
a controller; and
an interconnection mechanism coupling the at least one communications interface and the controller;
wherein the controller is configured to:
receive, through the at least one communications interface, a content request from a requesting device, the content request having a requesting device identifier;
provide, through the at least one communications interface, the content request to an origin server when the requesting device identifier indicates the requesting device is a content server of the content delivery network; and
provide, through the at least one communications interface, the content request to a content router of the content delivery network when the requesting device identifier indicates the requesting device is a device not of the content delivery network;
wherein:
when receiving the content request from the requesting device the controller is configured to intercept the content request having the requesting device identifier and detecting the requesting device identifier of the content request to distinguish the content request as originating either external from the content delivery network or as originating internal to the content delivery network;
when providing the content request to the origin server device the controller is configured to transmit the content request to the origin server based upon detecting that the requesting device identifier indicates the content request as originating internal to the content delivery network from the content server; and
when providing the content request to the content router of the content delivery network device the controller is configured to transmit the content request to the content router of the content delivery network, for delivery to the content server of the content delivery network based upon detecting that the requesting device identifier indicates the content request as originating from a device external from the content delivery network;
based upon receiving a content device marker associated with the content request, the controller is configured to provide the content request to the origin server; and
based upon receiving no content device marker associated with the content request, the controller is configured to provide the content request to a content router of the content delivery network.

6. The computerized device of claim 5 wherein the controller, when receiving, is configured to receive the content request from a requesting device, the content request having a network address of the requesting device.

7. The computerized device of claim 6 wherein the controller, is further configured to:
compare the network address of the requesting device with at least one network identification entry, each of the at least one network identification entries corresponding to a content server of the content delivery network;

based upon detecting a correspondence between the network address and one of the at least one network identification entries, provide the content request to the origin server; and
based upon detecting no correspondence between the network address and any of the at least one network identification entries, provide the content request to a content router of the content delivery network.

8. The computerized device of claim 6 wherein the controller is configured to receive configuration instructions having at least one network identification entry, the at least one network identification entry corresponding to a content server of the content delivery network.

9. The computerized device of claim 5 wherein the computerized device comprises a content switch.

10. The computerized device of claim 9 wherein the content switch is selected from the group consisting of a Content Services Switch or a Content Switching Module.

11. A computer program product stored on a computer-readable medium that, when performed on a controller in a computerized device having a coupling to at least one communications interface provides a method for performing the operations of:
receiving, through the at least one communications interface, the content request from a requesting device, the content request having a requesting device identifier;
providing, through the at least one communications interface, the content request to the origin server when the requesting device identifier indicates the requesting device is a content server of the content delivery network; and
providing, through the at least one communications interface, the content request to a content router of the content delivery network when the requesting device identifier indicates the requesting device is a device not of the content delivery network;
wherein:
receiving the content request from the requesting device comprises intercepting the content request having the requesting device identifier and detecting the requesting device identifier of the content request to distinguish the content request as originating either external from the content delivery network or as originating internal to the content delivery network;
providing the content request to the origin server comprises transmitting the content request to the origin server based upon detecting that the requesting device identifier indicates the content request as originating internal to the content delivery network from the content server; and
providing the content request to the content router of the content delivery network comprises transmitting the content request to the content router of the content delivery network, for delivery to the content server of the content delivery network, based upon detecting that the requesting device identifier indicates the content request as originating from a device external from the content delivery network;
based upon receiving a content device marker associated with the content request, providing the content request to the origin server; and
based upon receiving no content device marker associated with the content request, providing the content request to a content router of the content delivery network.

12. A computerized device comprising:
at least one communications interface;
a controller; and
an interconnection mechanism coupling the at least one communications interface and the controller;
wherein the controller is configured to produce a means for delivering a content request, such means including:
means for receiving, through the at least one communications interface, the content request from a requesting device, the content request having a requesting device identifier;
means for providing, through the at least one communications interface, the content request to the origin server when the requesting device identifier indicates the requesting device is a content server of the content delivery network; and
means for providing, through the at least one communications interface, the content request to a content router of the content delivery network when the requesting device identifier indicates the requesting device is a device not of the content delivery network;
wherein:
means for receiving the content request from the requesting device comprises means for intercepting the content request having the requesting device identifier and detecting the requesting device identifier of the content request to distinguish the content request as originating either external from the content delivery network or as originating internal to the content delivery network;
means for providing the content request to the origin server comprises means for transmitting the content request to the origin server in response to detecting that the requesting device identifier indicates the content request as originating internal to the content delivery network from the content server; and
means for providing the content request to the content router of the content delivery network comprises means for transmitting the content request to the content router of the content delivery network, for delivery to the content server of the content delivery network, in response to detecting that the requesting device identifier indicates the content request as originating from a device external from the content delivery network;
means for providing the content request to the origin server comprises means for providing the content request to the origin server based upon receiving a content device marker associated with the content request: and
means for providing the content request to a content router of the content delivery network comprises providing the content request to a content router of the content delivery network based upon receiving no content device marker associated with the content request.

13. A content distribution system comprising:
an origin server configured to serve content; and
a content delivery network in communication with the origin server, the content delivery network having:
at least one content server configured to host content from the origin server, and
a content switch in communication with the origin server and in communication with the content server, the content switch configured to:
receive, through the at least one communications interface, the content request from a requesting device, the content request having a requesting device identifier,
provide, through the at least one communications interface, the content request to the origin server when the requesting device identifier indicates the requesting device is a content server of the content delivery network, and
provide, through the at least one communications interface, the content request to a content router of the content delivery network when the requesting device identifier indicates the requesting device is a device not of the content delivery network;
wherein the content switch is configured to:
when receiving the content request from the requesting device, intercept the content request having the requesting device identifier and detect the requesting device identifier of the content request to distinguish the content request as originating either external from the content delivery network or as originating internal to the content delivery network;
when providing the content request to the origin server, transmit the content request to the origin server based upon detecting that the requesting device identifier indicates the content request as originating internal to the content delivery network from the content server; and
when providing the content request to the content router of the content delivery network, transmitting the content request to the content router of the content delivery network, for delivery to the content server of the content delivery network, based upon detecting that the requesting device identifier indicates the content request as originating from a device external from the content delivery network;
based upon receiving a content device marker associated with the content request, providing the content request to the origin server; and
based upon receiving no content device marker associated with the content request, providing the content request to a content router of the content deliver network.

* * * * *